United States Patent Office 3,330,149
Patented July 11, 1967

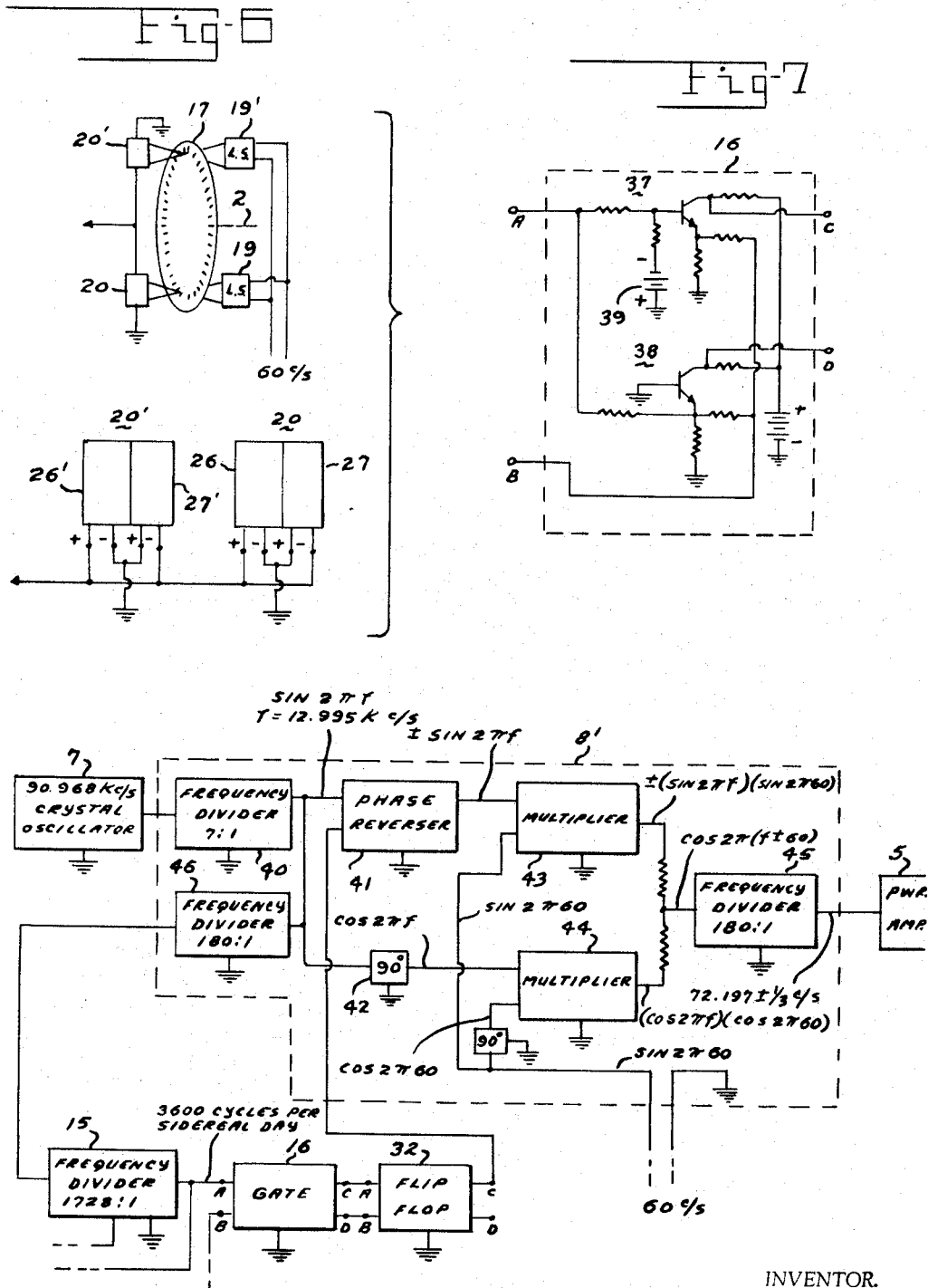

3,330,149
ROTARY TEST TABLE RATE SMOOTHER
Philip R. Scott, Jr., Sudbury, Mass., assignor to the United States of America as represented by the Secretary of the Air Force
Filed Feb. 2, 1965, Ser. No. 429,935
8 Claims. (Cl. 73—1)

This invention is specifically concerned with a problem that arises in the measurement of the mass unbalance and compliance errors of a gyroscope or a system of gyroscopes. In making these measurements the instruments are mounted on the face of a test table which rotates about an axis parallel to the earth's axis of rotation. The speed and direction of rotation are such that the rotation of the earth is cancelled and the instruments are held in a fixed orientation in inertial space. The gyroscope under test is held at null by torque current. The current required is proportional to the mass unbalance and compliance errors that occur as gravity rotates about the instrument, and the recorded values of this current are used in computing the error terms. The mass unbalance term is approximately sinusoidal with a period of one sidereal day while the compliance term has a period of a half sidereal day.

This method requires close control of the test table rate. If the table rate is not held constant, the instrument under test will call for additional torque current which adds a spurious component to the error signal that it is desired to measure. For this reason the table is driven by a synchronous motor controlled by a crystal clock. The accuracy of such clocks is better than a part per million, which is more than adequate.

Since the test table revolves at the very low rate of one revolution per sidereal day while the synchronous motor rotates at a relatively high speed, a high ratio reduction gear train is required between the motor and the table. Error in rotational rate is introduced by these gears. The average rate over a complete revolution of the table is correct, but gear imperfections will cause irregularities to appear in the data. If the irregularities are small compared to the gyroscope error a smooth curve can be drawn through the data. However, a high quality gyroscope will have small error amplitude which may be lost in the error introduced by gear imperfections.

The frequency of the spurious signal produced by the gears may cover a considerable range. Where the frequency is high relative to mass unbalance and compliance error frequencies, one cycle per sidereal day for the former and two cycles per sidereal day for the latter, it may be possible to adjust the cutoff frequency of the torque data loop to pass the desired error data while rejecting the gear "noise." However, the frequency of the spurious signal resulting from bunching and eccentricity errors that may occur in the cutting and installation of the gears, particularly the last gear in the train, is near or equal to the frequencies of the signals due to mass unbalance and compliance errors of the gyroscope and cannot be separated by this method.

It is the purpose of the invention to prevent low frequency rotational rate errors in a gyroscope test table, as described above, or in any other slowly rotating object. In accordance with the invention, the angular position of the test table, or other slowly rotating body, is monitored by means of an opaque glass scale that rotates with the table and has a relatively large number, for example 3600, transparent lines of equal angular spacing. An optical readout device produces a pulse each time a line passes. Each pulse is compared with a clock signal to determine whether the table is ahead or behind. A logic circuit uses this information to speed or slow the table drive motor between pulses are required to maintain substantial synchronism between the optical readout pulses and the clock signal. The advance and retard rates are constant and last through the interval between pulses. They are made greater than the maximum expected gear error rate.

While, in this system, the table rate is never correct at any instant, the average rate at any point in the rotational cycle of the table is correct, and, while the cycling between advance and retard rates introduces a spurious signal, its frequency is much higher than the frequencies of the desired mass unbalance and compliance error signals of the gyroscope and can be separated therefrom on a frequency basis.

A further purpose of the invention is to provide a high resolution optical angular position monitor utilizing the glass scale referred to above with a high resolution optical readout device.

A more detailed description of the invention will be given with reference to the specific embodiment thereof shown in the accompanying drawings in which FIG. 1 is a block diagram of the test table rate smoother in accordance with the invention;

FIG. 6 shows a method of compensating for eccentricity in the table position monitor scale;

FIG. 7 shows a suitable circuit for gate 16 of FIG. 1,

FIG. 8 shows an electronic frequency changing circuit that may be used in place of the electro-mechanical frequency changing circuit 8 of FIG. 1; and FIG. 9 illustrates a specific embodiment of FIG. 8.

Figure 1:
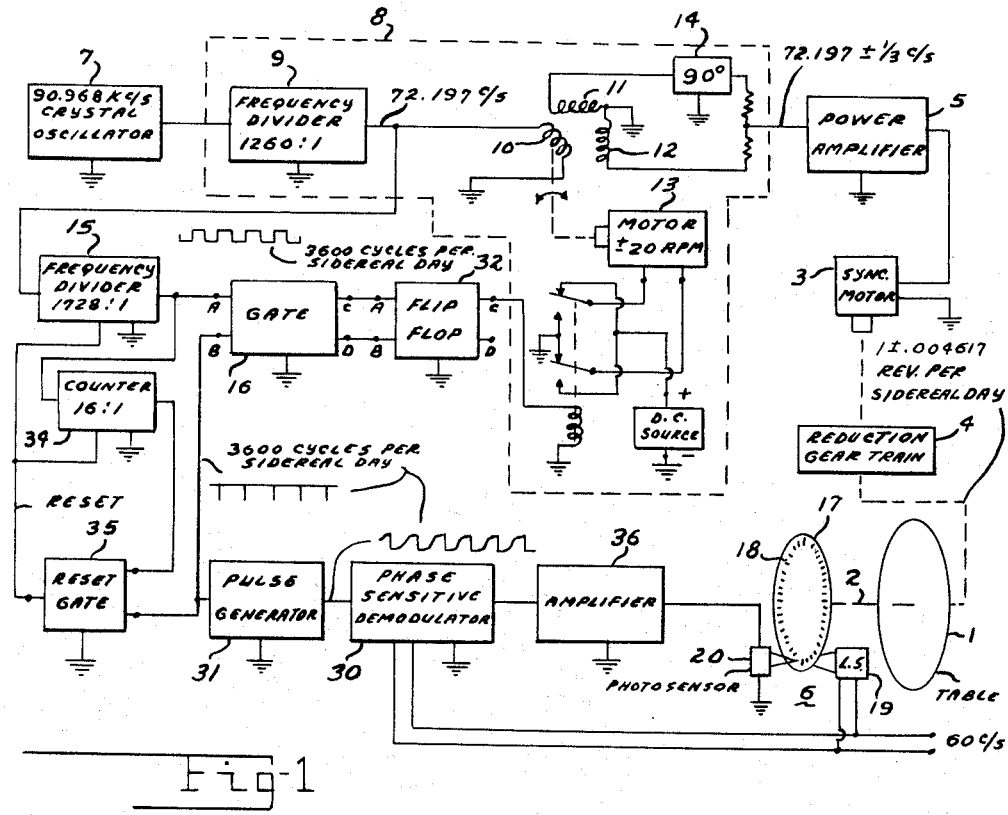

Referring to FIG. 1, the test table 1 is mounted on a shaft 2 which is positioned parallel to the earth's rotational axis and which is driven by synchronous motor 3 through reduction gear train 4 to make one revolution in a sidereal day, or 23 hours 56 minutes and 4.09 seconds. The motor is energized by alternating current from power amplifier 5. The mean frequency of this current, in the example given, is 72.197 c./s. It must be a multiple, in this case 1728, of the average frequency produced by table position monitor 6, to be described later. This mean frequency is defined as the number of cycles produced by the monitor in one revolution of the table, in this case 3600, divided by the number of seconds in a sidereal day, or approximately 86164.

The accuracy of the speed of motor 3 is maintained by crystal controlled oscillator 7 having a constant frequency, in this case, of 90,968 kc./s. The output of oscillator 7 passes through a frequency changing network 8 before application to the input of power amplifier 5. In this network, the oscillator output frequency is first reduced in frequency divider 9 by a factor of 1260 to produce the frequency 72.197 c./s. This frequency is then applied to the primary winding 10 of a resolver having secondary windings 11 and 12 spaced 90° apart. Primary winding 10 is rotated at all times, in one direction or the other, by constant speed motor 13 at a speed of 20 r.p.m. or ⅓ revolution per second. The amplitudes of the voltages induced in the secondary windings of the resolver vary as the sine and cosine of the rotational angle of the primary. If one of these voltages is shifted in phase by 90°, as by a phase shifting network 14, and the two are added a vector rotating at ⅓ revolution per second is produced. The effect of this is to add or subtract ⅓ cycle per second to or from the 72.197 c./s. wave to produce a frequency at the input of power amplifier 5 that is ⅓ c./s. greater than or ⅓ c./s. less than the mean frequency of 72.197 c./s., depending upon the direction of rotation of motor 13. This slightly increases or decreases the speed of synchronous motor 3 from its correct mean speed for correcting ahead or behind conditions of table 1 within its rotational cycle as caused by the previously discussed gear imperfections.

In order to determine whether at any instant the table 1 is ahead or behind in its rotational cycle, its rotational phase is compared with the phase of a wave that is the submultiple of the 72.197 c./s. wave which equals the average frequency of the table angular position monitor to be described. The reference wave is derived from the 72.197 c./s. output of frequency divider 9 by 1728:1 frequency divider 15 and is applied to input A of gate 16. The angular position of table 1 is accurately monitored by the high resolution optical monitoring device 6 the principal elements of which are an opaque disc 17 mounted on shaft 2 and having 3600 equally spaced radial slits 18, a 60 c./s. modulated light source 19 and a photosensor 20. These elements are shown in more detail in FIGS. 2, 3 and 4.

Figure 2:
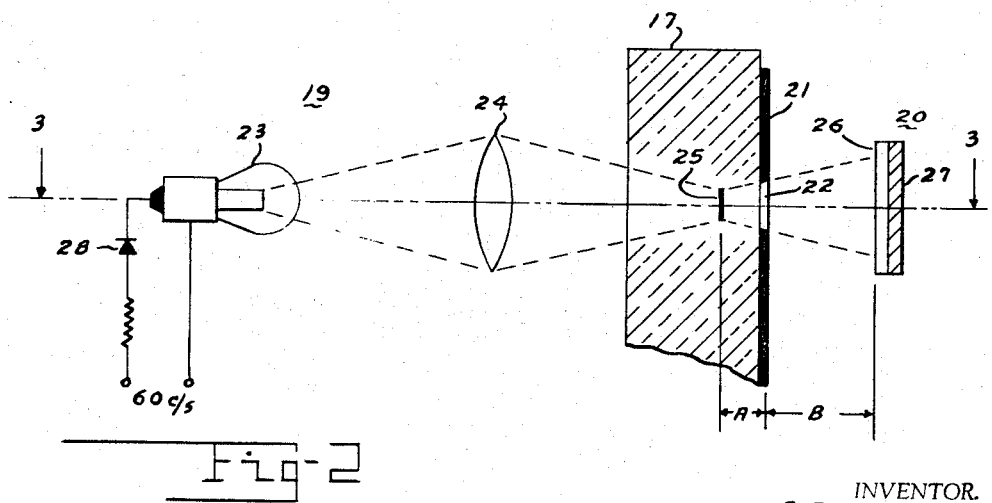
FIGS. 2 and 3 are sectional views of the table monitor and optical readout device.
Figure 3:
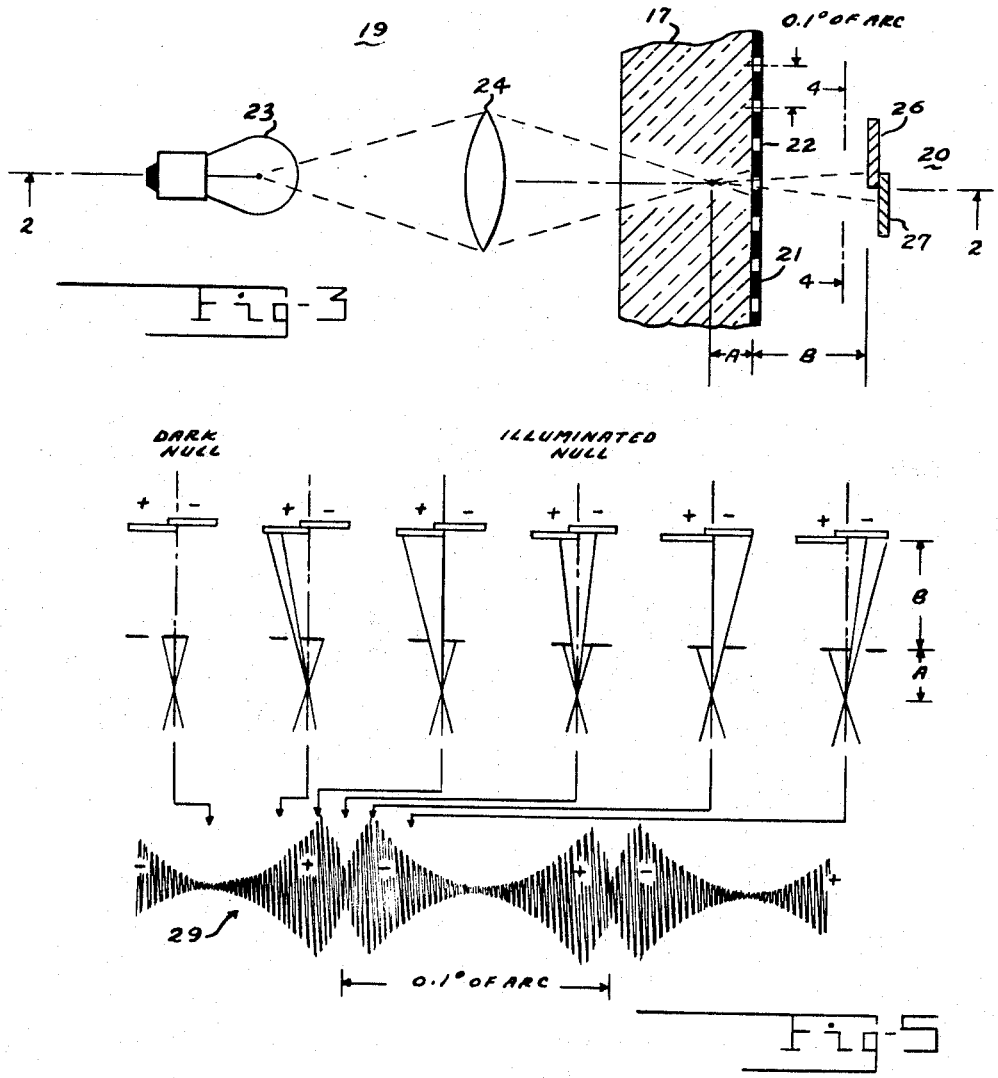
Figure 4:
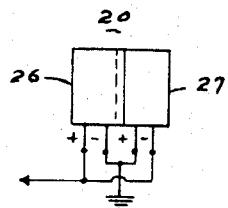
FIG. 4 illustrates the connection of photocells in the optical readout device.

Referring to FIGS. 2 and 3, the disc 17 may be made of glass having an opaque coating 21 on one side. Small equally spaced radial transparent slits 22 are provided in the opaque coating. There are 3600 so that the slit separation is 0.1° of arc. A scale of this type of the required accuracy may be fabricated using photographic techniques or by machine scribing, for example. The light source 19 comprises an incandescent lamp 23 having a line filament and a lens system 24 for forming an image 25 of the filament at a distance A behind the opaque coating 21. Lamp 23 is energized from a 60 c./s. source through diode 28 so that its light output is modulated at 60 c./s. The photosensor 20 is made up of two photoelectric cells 26 and 27, which may be silicon solar cells for example, overlapped to form a sharp line of demarcation and positioned on the opposite side of the opaque coating from the filament image. As best seen in FIG. 3, the relative positions of the filament image and the photosensor are such that the filament image and the photocell faces are parallel to the opaque coating and such that the filament image and the line of demarcation between the photocells lie in a radial plane normal to the opaque coating. Consequently, when a slit is centered on this plane the light from the filament image divides equally between the photocells. The photocells are connected in opposition, as shown in FIG. 4, so that their equal outputs cancel and a null is produced in this position. A series connection of the photocells could also be used.

Figure 5:
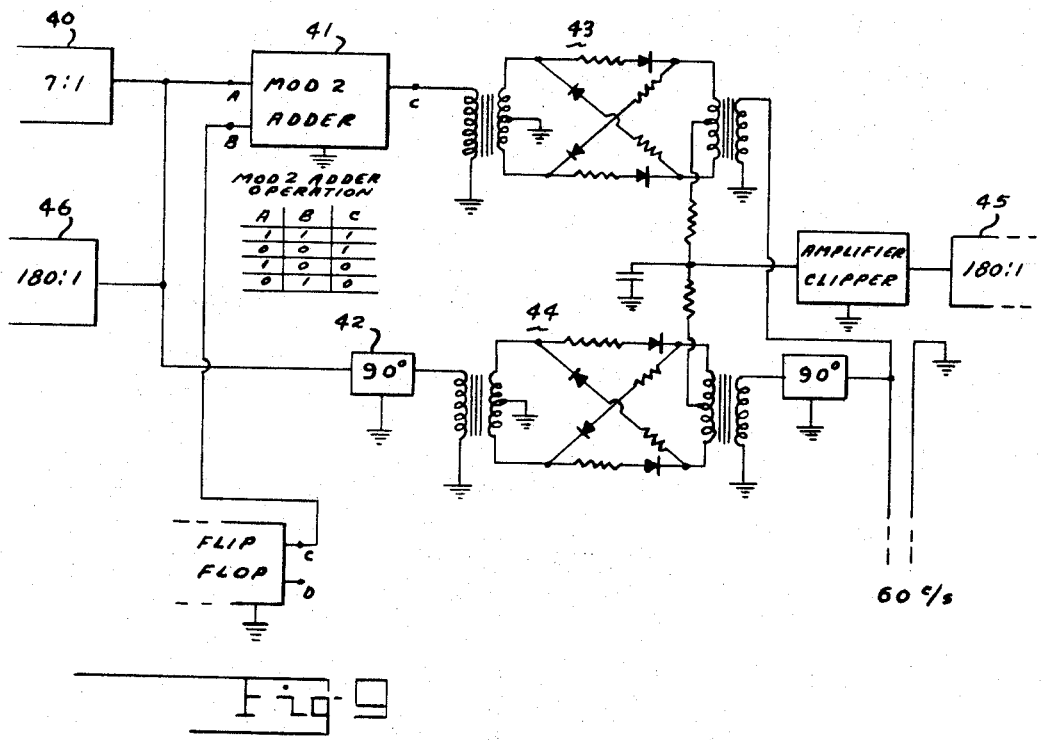
FIG. 5 illustrates the operation of the readout device and the waveform of the signal produced thereby.

Waveform 29 in FIG. 5 illustrates the A.C. component of the output of photosensor 20. Also shown in FIG. 5 are the position of the slit relative to the filament image at several points on the waveform. As will be seen, a dark null is produced when the photosensor is midway between slits and no light falls on either photocell, and an illuminated null is produced when the slit is centered on the photosensor center and the light is equally divided between the photocells. The latter is much sharper and is utilized to mark the table position. It will be apparent that with the slit operating as in a pin-hole camera the motion of the image 25 relative to the photosensor is amplified by the ratio $B/A$. Therefore, by making A small so as to increase this ratio, very high resolution may be obtained. A has been shown disproportionately large in the drawing for convenience. The output of each photocell is modulated at 60 c./s. due to the light modulation at this frequency. Since the cells are connected in opposition the phase of the output signal reverses each time a null is passed.

Referring again to FIG. 1, the output of photosensor 20, illustrated by waveform 29 in FIG. 5, is amplified and applied to phase sensitive demodulator 30 to which a 60 c./s. signal from the energizing source for light 19 is also applied as a reference phase. Phase sensitive demodulators are well known in the art and any suitable type may be used. Some types produce an output of one polarity when the signal and reference phases are in agreement and an output of the opposite polarity when the phases are in opposition; others produce a change in output magnitude when the phase reverses. By the use of clipping in the demodulator a substantially rectangular output may be obtained, however, the wave front occurring at the illuminated null is much steeper than that occurring at the dark null due to the greater sharpness of the former. By proper choice of the reference phase in demodulator 30, the illuminated nulls may be made to produce the negative-going edges of the output wave as illustrated in the waveform shown in FIG. 1. These edges are converted into coincident sharp negative-going pulses by pulse generator 31, for example a differentiating circuit, which are applied to input B of gate 16. One of these pulses occurs each time a slit 22 in the scale 17 passes the center of the photosensor 20. There are therefore 3600 such pulses produced in each revolution of table 1 so that the average interval between pulses is approximately 24 seconds.

As stated earlier, the output of frequency divider 15 is used as a reference to determine whether the table 1 is ahead or behind in its rotational cycle. Divider 15 is a binary counter and its output is inherently a rectangular wave of 50% duty cycle. Either its positive-going or its negative-going edges may be used as a reference, either occurring at a constant rate of 3600 per sidereal day under control of oscillator 7. Gate 16 compares the time of occurrence of each negative pulse at input B with the edge of the rectangular wave at input A. If the edge of the rectangular wave occurs first, indicating that table 1 is behind at that instant, output C of gate 16 is energized. This triggers flip-flop 32 to the state in which its output C is energized, if not already in this state. With output C energized, relay 33 is actuated causing motor 13 to run in the frequency increasing direction with the result that a frequency of 72.197+⅓ c./s. is applied to synchronous motor 3. This causes the motor to run at the greater of its two normal speeds. The increased rate is maintained throughout the ensuing approximately 24 second interval between pulses. The next pulse to occur at input B of gate 16 will again occur after the edge of the square wave occurs at terminal A if there has been insufficient correction during the pulse interval, or it will occur slightly earlier than the rectangular wave edge if there has been a slight overcorrection. In the former case nothing changes and the increased speed is maintained for another pulse interval. In the latter case, output D of gate 16 is energized which energizes input B of flip-flop 32 causing its output C to be deenergized. This deenergizes relay 33 and reverses the direction of motor 13 so that the frequency applied to synchronous motor 3 is 72.197−⅓ c./s. As a result of the lower frequency, motor 3 runs at the lower of its two normal speeds, initiating a correction of the now ahead condition of the table. Therefore, in normal operation of the system, the speed of motor 3 never has the correct value, as represented by the mean frequency of 72.197 kc./s., but switches between values slightly higher and slightly lower than the correct value as required to keep the pulses at input B of gate 16 in substantial coincidence with the edges of the rectangular wave at input A, thus counteracting the effect of gear imperfection on the angular velocity of table 1. As a result, the average speed of the table is correct throughout its rotational cycle. Although the continuous oscillation of the table speed between values slightly above and slightly below correct speed inherent in the system produces a spurious component in the error signal of the gyroscope under test, its frequency is much higher than the mass unbalance and compliance error signal frequencies and it can be separated from these error signals on a frequence difference basis.

It is necessary to provide means to initially align the pulses produced by the table position monitor at input B of gate 16 with the frequency divider output at input A.

This is accomplished by counter 34 and reset gate 35 which is an AND gate. At each 16th pulse in the output of divider 15 counter 34 energizes input A of gate 35. The negative pulses at input B of gate 16 are also applied to input B of gate 35. The next pulse to occur after input A is energized passes gate 35 and resets divider 15 so that the edge of its output wave is coincident with the reset pulse, thus establishing synchronism in the system. The reset pulse also resets counter 34 after which the cycle repeats. During normal operation substantial synchronism is automatically maintained so that resetting the counters has no significant effect on system operation. However, should a temporary malfunction occur, this circuit prevents the system from operating in error for more than 16 pulse intervals.

The center of the glass scale 17 must be exactly aligned with the axis of table 1. Misalignment will cause the generation of a cyclic error in the data of the same nature as the error caused by eccentricity in the gears. The eccentricity error of the scale may be reduced by using two readers located 180° apart on the scale as illustrated in FIG. 6. The outputs of the two readers are connected in parallel aiding relation and the combined signal is fed to the preamplifier 36. The null of the resulting signal averages out departures caused by eccentricity. This arrangement also tends to reduce bunching errors due to misplacement of the slits.

Gate 16 of FIG. 1 may be any suitable logic for performing the described function. FIG. 7 is an example. In this circuit, the rectangular wave at input A is applied to the base of transistor 37 and to the emitter of transistor 38, and the negative pulses at input B are applied to the emitter of each transistor. It will be assumed that the rectangular wave causes the potential of input A to vary in voltage between zero and a positive value and that the negative pulses cause input B to vary in voltage between zero and a negative value. Battery 39 biases the base of transistor negative relative to the emitter by an amount slightly greater than the amplitude of the rectangular wave at input A. If the positive-going edge of the rectangular wave at A occurs before the negative pulse at B the base of transistor 37 is raised almost to the point of emitter conduction. Therefore when a negative pulse occurs at input B the emitter conducts, causing a pulse of collector current to flow and a negative voltage pulse to be produced at C. An output pulse does not occur at D since the negative pulse is unable to overcome the emitter cutoff produced by the positive voltage at A. If, on the other hand, the negative pulse at B occurs before the positive pulse at A no pulse is produced at C, since the negative pulse cannot overcome the cutoff bias provided by battery 39, but a negative pulse is produced at output D since, in this case, there is no cutoff bias applied to the emitter circuit.

FIGS. 8 and 9 show an electronic frequency changing circuit 8′ that may be directly substituted for the electromechanical frequency changing circuit 8 of FIG. 1. Referring to FIG. 8, the output of oscillator 7 is divided by 7 in divider 40 to produce a wave which may be represented by $\sin 2\pi f$, where $f = 12.995$ kc./s. This wave is applied to phase reverser 41 which is controlled by flip-flop 32. The output of the phase reverser is either $\sin 2\pi f$ or $-\sin 2\pi f$ depending upon the state of bistable circuit 32. The output of divider 40, $\sin 2\pi f$, is shifted 90° in phase by a 90° network 42 to produce a wave that may be represented by $\cos 2\pi f$. The wave $\pm \sin 2\pi f$ from reverser 41 is multiplied, in multiplier 43, by a 60 c./s. wave represented by $\sin 2\pi 60$ to produce the product $\pm(\sin 2\pi f)(\sin 2\pi 60)$. Similarly, the waves $\cos 2\pi f$ and $\cos 2\pi 60$, obtained from $\sin 22\pi 60$ by a 90° phase shift, are multiplied in multiplier 44 to produce the product $(\cos 2\pi f)(\cos 2\pi 60)$. These two products are added at the input of frequency divider 45 to produce the wave $\cos 2\pi(f \pm 60)$. Since $f = 12.995$ kc./s., $\cos 2\pi(f \pm 60)$ represents a wave of frequency $12,995 \pm 60$ c./s. Dividing this by 180 in divider 45 gives the required $72.197 \pm \frac{1}{3}$ c./s. Therefore, with output C of flip-flop 32 energized, the frequency at the input of lower amplifier 5 is $72.197 + \frac{1}{3}$ c./s. and with flip-flop 32 in its other stable state, in which its output C is deenergized, the frequency is $72.197 - \frac{1}{3}$ c./s. The results, therefore, are the same as those produced by circuit 8 in FIG. 1. An additional 180:1 divider 46 is provided to supply the proper frequency to frequency divider 15. It is not necessary that the various waves represented by the sine and cosine terms be actually sinusoidal in form since it has been found experimentally that the proper frequencies are produced with waves having shapes other than sinusoidal providing that the fundamental frequencies are correct.

FIG. 9 illustrates suitable forms that the principal elements of FIG. 8 may take. For example, phase reverser 41 may be a Mod 2 adder which is a standard element well known in the computer art. The operation of this type adder is illustrated in the table given. From this table it is seen that like inputs, either 1 or 0, produce a 1 output while unlike inputs produce a 0 output. Interpreting the operation of the adder as a phase inverter, + may correspond to 1 and − to 0. Thus, if terminal B is +, terminal C will be + when A is + and − when A is −, so that no phase reversal occurs. However, if B is −, a phase reversal occurs since in this case when A is + C is − and when A is − C is +. Any suitable type of device producing intermodulation of the applied waves may be employed for multipliers 43 and 44 since such a circuit gives a product term. One example is the well known phase sensitive demodulator circuit shown. As stated earlier it is not necessary that the waveforms in the system be sinusoidal; hence it is not necessary to employ filters to derive these waveforms.

The specific frequencies and other constants given in the described embodiment of the invention are, of course, for illustrative purposes only. The values used in any particular application will depend upon various factors such as the speed of the rotating body, the synchronous motor specifications, the overall ratio of the speed reducing gear train, the accuracy of control desired, etc. The general expression for the frequency of oscillator 7 is $D_1 D_2 N/P$, where $D_1$ is the dividing factor for frequency divider 9, $D_2$ is the dividing factor for frequency divider 15, N is the number of transparent slits in the angular position monitor scale 17 and P is the rotational period of the table 1 or other rotating body. In the specific example given, $D_1 = 1260$, $D_2 = 1728$, $N = 3600$ and $P =$ one sidereal day or 86164.09 seconds.

I claim:

1. Apparatus for maintaining the angular velocity of a slowly rotating body driven by a synchronous motor at a substantially constant value, said apparatus comprising: an angular position monitor coupled to said body for producing an electrical pulse after each $360/N$ degrees of rotation of said body, where N is an integer; a stable oscillator having a frequency $D_1 D_2 N/P$, where $D_1$ and $D_2$ are integers and P is the rotational period of said body; means for dividing the frequency of said oscillator by $D_1$ and for applying the resulting frequency to a frequency changer having two possible states in one of which it increases the applied frequency by a small predetermined amount and in the other of which it decreases the applied frequency by said predetermined amount; means coupled to the output of said changer and to said motor for energizing said motor at the changer output frequency; means for dividing the frequency applied to said changer by $D_2$ to produce a reference wave; and means for comparing the phase of the pulse wave produced by said monitor with the phase of said reference wave and operating when said monitor pulse wave lags said reference pulse wave to place said frequency changer in its frequency increasing state and operating when said monitor pulse wave leads said reference wave to place said frequency changer in its frequency decreasing state.

2. In a gyroscope testing system having a test table rotated about an axis parallel to the earth's axis at the rate of one revolution per sidereal day by a synchronous motor acting through speed reducing gears, apparatus for counteracting the slight variations in the angular velocity of said table due to imperfections in said gears, said apparatus comprising: an angular position monitor coupled directly to said table for producing an electrical pulse after each 360/$N$ degrees of rotation of said table, where $N$ is an integer; a stable oscillator having a frequency $D_1D_2N/P$, where $D_1$ and $D_2$ are integers and $P$ is the rotational period of said table; means for dividing the frequency of said oscillator by $D_1$ and for applying the resulting frequency to a frequency changer having two possible states in one of which its increases the applied frequency by a small predetermined amount and in the other of which it decreases the applied frequency by said predetermined amount; means coupled to the output of said changer and to said motor for energizing said motor at the changer output frequency; means for dividing the frequency applied to said changer by $D_2$ to produce a reference wave; and means for comparing the phase of the pulse wave produced by said monitor with the phase of said reference wave and operating when said monitor pulse wave lags said reference pulse wave to place said frequency changer in its frequency increasing state and operating when said monitor pulse wave leads said reference wave to place said frequency changer in its frequency decreasing state.

3. In a gyroscope testing system having a test table rotated about an axis parallel to the earth's axis at the rate of one revolution per sidereal day by a synchronous motor acting through speed reducing gears, apparatus for counteracting the slight variations in the angular velocity of said table due to imperfections in said gears, said apparatus comprising: an angular position monitor coupled directly to said table for producing an electrical pulse after each 360/$N$ degrees of rotation of said table, where $N$ is an integer; a stable oscillator having a frequency $D_1D_2N/P$, where $D_1$ and $D_2$ are integers and $P$ is the rotational period of said table; a resolver having a rotatable primary winding and a pair of secondary windings in which voltages proportional to the sine and cosine of the primary rotational angle are produced; means for dividing the frequency of said oscillator by $D_1$ and for applying the resulting frequency to the primary of said resolver; a constant low speed reversible motor coupled to said primary for rotating it in either direction; means producing a quadrature phase shift of one resolver secondary voltage and for adding said quadrature voltage to the other resolver secondary voltage to produce a resolver output voltage having a frequency that differs from the resolver primary frequency by a fixed small amount, the sign of said difference depending upon the direction of rotation of said reversible motor; means coupled to the output of said resolver and to said synchronous motor for energizing said motor at the resolver output frequency; means for dividing the frequency applied to said resolver primary by $D_2$ to produce a reference wave; and means comparing the phase of the pulse wave produced by said monitor with the phase of said reference wave and operating when said monitor pulse wave lags said reference pulse wave to energize said reversible motor for rotation in the resolver output frequency increasing direction and operating when said monitor pulse wave leads said reference wave to energize said reversible motor in the resolver output frequency decreasing direction.

4. In a gyroscope testing system having a test table rotated about an axis parallel to the earth's axis at the rate of one revolution per sidereal day by a synchronous motor acting through speed reducing gears, apparatus for counteracting the slight variations in the angular velocity of said table due to imperfections in said gears, said apparatus comprising: an angular position monitor coupled directly to said table for producing an electrical pulse after each 360/$N$ degrees of rotation of said table, where $N$ is an integer; a stable oscillator having a frequency $rqD_2N/P$, where $r$, $q$ and $D_2$ are integers and $P$ is the rotational period of said table; a first frequency divider coupled to said oscillator for dividing the oscillator frequency by the factor $r$; first and second multipliers; a phase control network having two states in one of which an applied signal is reversed in phase in transmission therethrough and in the other of which an applied signal is transmitted without change in phase; means for applying the output of said first frequency divider through said phase control network to an input of said first multiplier and through a quadrature phase shifting network to an input of said second multiplier; means for applying a constant low frequency signal to an input of said first multiplier and after a quadrature shift in phase to an input of said second multiplier; means for adding the outputs of said multipliers to produce a wave of frequency that differs from the frequency at the output of said first frequency divider by a fixed amount, the sign of said difference depending upon the state of said phase control network; a second frequency divider receiving the added output of said multipliers and dividing the frequency of said output by a factor $q$ equal to a small multiple of the frequency of said low frequency signal; means coupled to the output of said second frequency divider and to said synchronous motor for energizing said motor at the second frequency divider output frequency; means for dividing the frequency at the output of said first frequency divider by the factor $qD_2$ to produce a reference wave; and means comparing the phase of the pulse wave produced by said monitor with the phase of said reference wave and operating when said monitor pulse wave lags said reference wave to place said phase control network in its frequency increasing state and operating when said monitor pulse wave leads said reference wave to place said phase control network in its frequency decreasing state.

5. In a gyroscope testing system having a test table rotated about an axis parallel to the earth's axis at the rate of one revolution per sidereal day by a synchronous motor acting through speed reducing gears, apparatus for counteracting the slight variations in the angular velocity of said table due to imperfections in said gears, said apparatus comprising: an angular position monitor coupled directly to said table for producing an electrical pulse of very short duration after each 360/$N$ degrees of rotation of said table, where $N$ is an integer; a stable oscillator having a frequency $D_1D_2N/P$, where $D_1$ and $D_2$ are integers and $P$ is the rotational period of said table; a first frequency divider coupled to said oscillator for dividing the frequency of said oscillator by $D_1$; a frequency changer having two possible states in one of which it increases an applied frequency by a small predetermined amount and in the other of which it decreases the applied frequency by said predetermined amount; means for applying the output of said first frequency divider to said frequency changer; means coupled to the output of said changer and to said motor for energizing said motor at the changer output frequency; a second frequency divider coupled to the output of said first frequency divider for producing a rectangular wave having a frequency equal to the output frequency of said first frequency divider divided by $D_2$; means for comparing the time of occurrence of each of the pulses produced by said monitor with the time of occurrence of an edge of said rectangular wave and operative when a monitor pulse lags said rectangular pulse edge to place said frequency changer in its frequency increasing state and operating when said monitor pulse leads said edge to place said frequency changer in its frequency decreasing state; a counter coupled to the output of said second frequency divider and producing an output after counting a predetermined number of cycles of said rectangular wave; and means receiving the output of said counter and said monitor pulses and operative at the first occurrence of a monitor pulse in the presence of an output from said counter to apply reset pulses to said second frequency divider and said counter for resetting the edge of said rectangular wave to coincidence with said reset pulse and to reset said counter to zero.

6. A high resolution angular position monitor for a slowly rotating body for producing an electrical pulse after each 360/N degrees of rotation of said body, where N is an integer, said monitor comprising: means directly connected to said body for rotation at the same speed as said body about the same rotational axis, said means having an opaque surface normal to said axis, and said surface having a scale consisting of N equally spaced transparent radial slits lying in a circle concentric with said axis; a stationary optical reader for said scale having a center defined by a central plane passing through said axis, said reader comprising a line source of light modulated at a constant frequency, means forming an image of said source close to said opaque surface, said image lying in said central plane and being parallel to said opaque surface at the same radial distance as said slits, a photosensor on the opposite side of said opaque surface from said image, said photosensor comprising two flat photocells having a straight line of demarcation therebetween, said photocells being parallel to said opaque surface and said line of demarcation lying in said central plane, the distance of said photocells from said opaque surface being considerably greater than the distance of said image therefrom; and means connecting said photocells in polarity opposition to produce an output signal in which a null occurs when a slit is centered on said central plane and another null occurs when said central plane is midway between slits, the phase of the output signal reversing as the signal passes through each null.

7. A high resolution angular position monitor for a slowly rotating body for producing an electrical pulse after each 360/N degreess of rotation of said body, where N is an integer, said monitor comprising: means directly connected to said body for rotation at the same speed as said body about the same rotational axis, said means having an opaque surface normal to said axis, and said surface having a scale consisting of N equally spaced transparent radial slits lying in a circle concentric with said axis; a stationary optical reader for said scale having a center defined by a central plane passing through said axis, said reader comprising a line source of light modulated at a constant frequency, means forming an image of said source close to said opaque surface, said image lying in said central plane and being parallel to said opaque surface at the same radial distance as said slits, a photosensor on the opposite side of said opaque surface from said image, said photosensor comprising two flat photocells having a straight line of demarcation therebetween, said photocells being parallel to said opaque surface and said line of demarcation lying in said central plane, the distance of said photocells from said opaque surface being considerably greater than the distance of said image therefrom; means connecting said photocells in polarity opposition to produce an output signal in which a null occurs when a slit is centered on said central plane and another null occurs when said central plane is midway between slits, the phase of the output signal reversing as the signal passes through each null; a phase sensitive demodulator; means for amplifying the output signal of said photocells and for applying the amplified signal to said demodulator and means for applying a voltage in phase with said light modulation as a reference phase to said demodulator, whereby said demodulator produces a substantially rectangular output wave the edges of which coincide with said nulls; and pulse generating means receiving said demodulator output wave and producing short duration pulses in coincidence with the edges of said wave corresponding to the nulls that occur when said slits are centered on said central plane.

8. Apparatus as claimed in claim 7 in which N is an even integer and in which there is provided a second optical reader identical to the first reader in construction and relationship to said scale but located 180° from said first reader, and means connecting the outputs of said readers in parallel aiding relationship to form an output signal for amplification and application to said demodulator.

References Cited

UNITED STATES PATENTS

| | | | |
|---|---|---|---|
| 2,788,519 | 4/1957 | Caldwell | 250—233 X |
| 2,910,638 | 10/1959 | Linn | 318—341 X |
| 3,005,940 | 10/1961 | Johnson | 318—341 X |
| 3,103,651 | 9/1963 | Heinecke et al. | 250—219 X |
| 3,164,978 | 1/1965 | Sharman et al. | 73—1 |

LOUIS R. PRINCE, *Primary Examiner.*

S. C. SWISHER, *Assistant Examiner.*